March 17, 1964   B. E. LENEHAN   3,125,722
FREQUENCY COMPENSATION FOR ALTERNATING CURRENT INSTRUMENTS
Filed Nov. 21, 1960

WITNESSES

INVENTOR
Bernard E. Lenehan
BY
ATTORNEY

United States Patent Office 3,125,722
Patented Mar. 17, 1964

3,125,722
FREQUENCY COMPENSATION FOR ALTERNATING CURRENT INSTRUMENTS
Bernard E. Lenehan, Bloomfield, N.J., assignor to Westinghouse Electric Corporation, East Pittsburgh, Pa., a corporation of Pennsylvania
Filed Nov. 21, 1960, Ser. No. 70,566
8 Claims. (Cl. 324—142)

This invention relates generally to frequency compensation for alternating current instruments and more especially for an alternating current wattmeter.

It is well known in the wattmeter art that some audio frequency compensation may be had by connecting a capacitor in parallel with the usual current limiting resistor which is series connected with the wattmeter voltage coil. This type of connection is satisfactory in many instances such as where the distributed capacitance of the voltage coil is negligible. However when the voltage coil has a distributed capacitance and mutual inductance, the wattmeter may deflect up to 2% of full scale reading due solely to current flow through the current coil.

A prime object of this invention is to provide an electrodynamic instrument having a greater frequency range than has been heretofore possible.

Another object of this invention is to provide frequency compensation for electrodynamic instruments.

A further object is to provide such compensation in an inexpensive and easy way.

A still further object is to provide a new and improved method for selecting the magnitude of the compensating elements.

Other objects will be apparent from the specification, the appended claims and the drawings in which:

FIGURE 1 diagrammatically illustrates a wattmeter embodying the invention;

Figure 1:
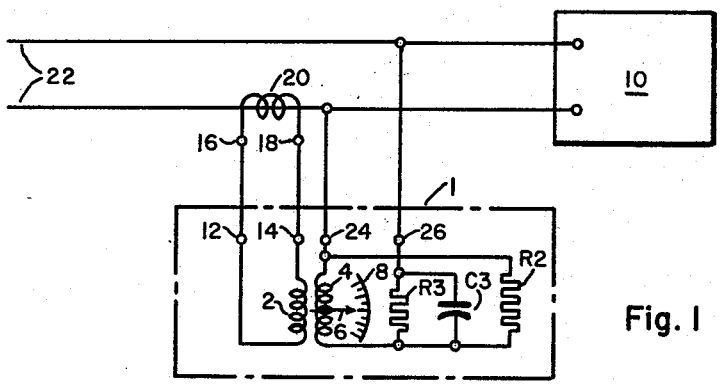

Referring to the drawings by characters of reference, the numeral 1 indicates generally an electrodynamic wattmeter having a current coil or winding 2 and a voltage coil winding 4 suitably pivotally supported in the field established by the coil 2 whereby it will assume a rotative position which is a function of the magnitude of the inphase current components flowing through the two coils. A pointer 6 is movable by the coil 4 and is cooperable with suitable indicia 8 to indicate the relative positions of the coils 2 and 4. As illustrated, the instrument 1 is a wattmeter but it will be apparent that the invention is usable in other types of electrodynamic instruments. The mechanical construction of and operation of electrodynamic instruments per se are well known and consequently need not be more than schematically illustrated.

The current coil 2 is connected to be traversed with a current proportional in magnitude and phase to the current flowing in the load 10. As illustrated the coil 2 is connected to current input terminals 12 and 14 which are connected to output terminals 16 and 18 of a current transformer 20 connected in the usual manner to one of the electrical supply conductors 22. If desired, the coil 2 could be directly connected in series in the supply conductor. The voltage coil 4 is connected between voltage input terminals 24 and 26 in series with a usual calibrating or current controlling resistor $R_3$ in a usual manner. The terminals 24 and 26 are connected to the conductors 22 whereby the coil 4 will be energized as a function of the potential being supplied to the load 10. A compensating capacitor $C_3$ is connected in shunt with the resistor $R_3$ and a resistor $R_2$ is connected in shunt with the coil 4.

As will be discussed in detail below, by properly relating the values of $C_3$ and $R_2$ with the values of the resistance $R_1$, inductance L, and the distributed capacitance (represented by capacitor $C_2$ in FIGS. 3–6) of the winding 4, the instrument L may be frequency compensated and whereby it will accurately indicate electrical values such as wattage in networks operating at widely different frequencies extending from commercial power frequencies of 25 cycles per second or less up into the audio frequency range of 20,000 cycles per second or more. Generally speaking the magnitudes of the resistor $R_2$ and capacitor $C_3$ are chosen such that any current circulating through the voltage coil 4 as a consequence of voltages induced therein due to current in the current coil 2 is displaced 90 degrees in phase with respect to the current flowing through the coil 2.

Figure 2:
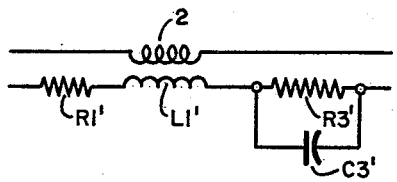
FIG. 2 is a schematic diagram of the frequency compensating scheme utilized in the prior art.

FIG. 2 illustrates schematically the prior art method commonly used to frequency compensate wattmeters. As illustrated, the voltage winding is represented as having resistance $R_1'$ and inductance $L_1'$. The capacitance of the voltage winding is neglected in this form of compensation as will be evident from the discussion below. As indicated in FIG. 2, the voltage winding is connected in series with a non-inductive current regulating resistor $R_3$. In order to frequency compensate the instrument, within the limits set forth below, a capacitor $C_3'$ is connected in shunt with the resistor $R_3'$. The magnitude of the capacitance $C_3'$ necessary for this purpose and within the limits set out below may be calculated by the well known formula for adding together series and parallel impedances and setting the J terms equal to zero. The formula for the impedance $Z_p$ of the network $R_1'$, $L_1'$, $R_3'$ and $C_3'$ of FIGURE 2 is $$Z_p = R_1' + JwL_1' + \frac{1}{\frac{1}{R_3'} - \frac{1}{JwC_3'}}$$

which is reducible to $$Z_p = R_1' + JwL_1' + \frac{R_3' - JwC_3'(R_3')^2}{1 + w^2(C_3')^2(R_3')^2}$$

If the product of $wC_3'R_3'$ is much less than 1 the formula for $Z_p$ reduces to $$Z_p = [R_1' + R_3'] + Jw[L_1' - C_3'(R_3')^2]$$

If $L_1'$ is made equal in magnitude to $C_3'(R_3')^2$ the J term becomes zero and drops out leaving only the resistance terms which do not change the phase of the current and the circuit will have approximately zero error. In the above $w$ equals $2\pi$ multiplied by the frequency ($f$) in cycles per second. In a typical instrument the values might be as follows: $R_1' = 200$ ohms; $L_1' = .004$ henries; $R_3' = 8000$ ohms; and $C_3' = 62.5$ micromicrofarads. In such an instance $wC_3'R_3'$ would equal .05 at $w=100,000$ (16,000 cycles per second).

As the frequency applied to the instrument increases, the magnitude of $wC_3'R_3'$ increases because $w$ includes the frequency term $f$ at a sufficiently increased frequency the term $wC_3'R_3'$ becomes a substantial part of one and the term $1+w^2(C_3')^2(R_3')^2$ becomes substantially different from 1 and this term can no longer be assumed to be equal to unity. The upper frequency limit for this prior art compensation is the point where the error, introduced as the term $1+w^2(C_3')^2(R_3)^2$ becomes sufficiently greater than unity, becomes sufficient to produce a readable error. When this occurs, it will be apparent that the instrument will no longer accurately indicate the measured quantity and will be operating above its frequency range. This error is, in a major part, due to the distributed capacitance of the voltage coil which in the instrument set forth above would be about 150 micromicrofarads and to the mutual inductance between the voltage winding and the current winding. This mutual inductance will cause a current to flow in the voltage winding because of current flow in the current winding. The magnitude of the mutual inductance M varies with the rotative position of the coils and can be as high as 8 times $10^{-5}$ henries.

Assuming a current coil current of 5 amperes and a voltage coil current of 31.25 milliamperes, the instrument could deflect nearly two percent of the full scale indication due solely to current flow in the current winding. With the disclosed frequency compensation in which a resistor $R_2$ is connected in shunt with the voltage winding 4 and the magnitudes of the resistance of the resistors $R_2$ and $R_3$ and of the capacitance of the capacitor $C_3$ are of proper relationship to the inductance and capacitance of the voltage winding 4 as set out below, this error can be largely prevented and the useful range of the instrument can be increased upwardly of forty percent over instruments utilizing the prior art method of frequency compensation and nearly to the theoretical limit.

Figure 3:
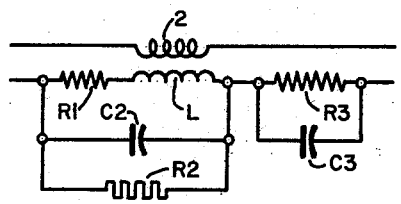
FIG. 3 is a schematic diagram of the frequency compensating scheme embodying this invention.

The current $i$ in the moving or voltage coil due to line voltage will be in accordance with ohms law and may be equated as follows:

$$i = E\frac{Z_2}{Z_1Z_2+Z_2Z_3+Z_3Z_1} \tag{1}$$

where E is the line voltage, $Z_1$ is the impedance due to $R_1$ and $L_1$, $Z_2$ is the impedance due to $R_2$ and $C_2$ and $Z_3$ is the impedance due to $R_3$ and $C_3$ arranged as illustrated in FIG. 3. $R_1$; $L_1$ and $C_2$ are respectively the resistance, inductance and capacitance of the voltage winding 4.

The voltage coil voltage induced by the current in the current winding 2 is $JwMI$ where I equals the current flowing in the current winding 2 and M, as set forth above, is the mutual inductance between the windings. The voltage coil current $i$ so induced may be equated as follows:

$$i = \frac{JwMi}{Z_1+\frac{Z_2Z_3}{Z_2+Z_3}} = JwMi\frac{Z_2+Z_3}{Z_1Z_2+Z_2Z_3+Z_3Z_1} \tag{2}$$

To get the correct watt readings, the current due to line voltage E must be in phase with respect to the line voltage or (1)

$$\frac{Z_2}{Z_1Z_2+Z_2Z_3+Z_1Z_3}$$

must equal zero degrees. To get no torque due to the current flowing in the coil 4 due solely to current flow in coil 2 (2)

$$\frac{Z_2+Z_3}{Z_1Z_2+Z_2Z_3+Z_1Z_3}$$

must equal zero degrees since the denominators (1) and (2) are both the same and both are equal to the same angle, $Z_2$ and $Z_3$ must have the same phase angle since that is the only way in which the phase angles of $Z_2$ and $Z_2+Z_3$ may both be made to equal each other.

Formula 1 may be written in the form $$i = \frac{E}{Z_1\left(1+\frac{Z_3}{Z_2}\right)+Z_3} \tag{3}$$

Similarly the Equation 2 may be written in the form $$i = JwMi\left[\frac{1}{Z_1\left(1+\frac{Z_3}{Z_2}\right)+Z_3} + \frac{1}{Z_1\left(1+\frac{Z_2}{Z_3}\right)+Z_2}\right] \tag{4}$$

Since the phase angle of $Z_2$ and $Z_3$ are the same $$\frac{Z_2}{Z_3}$$

and $$\frac{Z_3}{Z_2}$$

will each have the appearance of a real number.

Since the winding 4 must of necessity have resistance, inductance, and capacitance and resistor $R_3$ is required, it will be apparent that $Z_1$ must have resistance and inductance and $$Z_1\left(1+\frac{Z_3}{Z_2}\right) \text{ or } Z_1\left(1+\frac{Z_2}{Z_3}\right)$$

may be represented as $R+L$. If $Z_2$ and $Z_3$ are each $R+C$ then $$Z_1\left(1+\frac{Z_3}{Z_2}\right)+Z_3 \text{ or } Z_1\left(1+\frac{Z_2}{Z_3}\right)+Z_2$$

may be written $$(R+L)+(R_x+C_x)$$

If $C_x$ and $R_x$ are properly chosen the sum of $R+L+R_x+C_x$ may be made to look like pure resistance. It will now therefore be appreciated that if $R_2$ is added in parallel with the winding 4 and $C_3$ is added in shunt with the resistor $R_3$ the instrument may be substantially fully frequency compensated.

Figure 4:
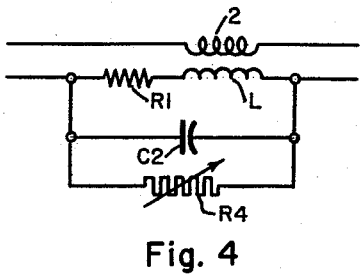
FIG. 4 is a schematic showing of one of the steps for empirically determining the value of the frequency compensating elements.

If desired the magnitudes of $R_3$, $C_3$ and $R_2$ may be calculated in accordance with the teachings above set out. These magnitudes may also be determined experimentally in the following manner. The first step is to apply maximum rated current to the winding 2 ($R_1+L+C_2$ as illustrated in FIG. 4) at a high frequency which preferably is not less than the maximum rated frequency of the instrument which may be upwards of 16,000 cycles per second. An adjustable resistance such as a decade resistance unit $R_4$ is connected across the terminals of the voltage winding 2 and the magnitude of the inserted resistance $R_4$ is varied until the deflection of the pointer 6 is zero. The magnitude of the inserted resistance $R_4$ is observed for use as will be described below. This is not the same as $R_2$ which will eventually be used in the completed instrument. If desired, the frequency which is used to determine $R_4$ may be variable and varied throughout and preferably above the rated frequency of the instrument. With the correct value of $R_4$ no deflection will occur.

Figure 5:
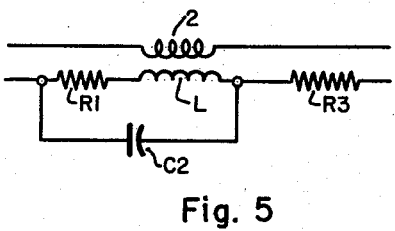
FIG. 5 is a schematic showing of another of the steps for empirically determining the value of the frequency compensating elements.

The value of $R_3$ is established, as diagrammatically illustrated in FIG. 5, by applying in phase rated current and voltage to the current and voltage coils at low frequency which preferably is not in excess of the minimum rated frequency of the instrument. Such a frequency could be of power frequency which in the U.S. is normally 15 to 60 cycles per second. A lower frequency and even zero frequency or direct current may be used, if desired. The value of $R_3$ is chosen to provide full scale deflection of the pointer 6. $R_3$ and $R_4$ now having been determined experimentally, the values of $R_2$ and $C_3$ may be obtained by the equation $C_3=KC_2$ and $R_2=KR_3$ where $$K = \frac{R_4^2}{2R_3^2} + \sqrt{\frac{R_4^2}{R_3^2} + \frac{R_4^4}{4R_3^4}} \tag{5}$$

The result, as will be explained below, closely approximates the true value of $C_3$ and $R_2$. If closer accuracy is desired, the values of $R_3$ and $C_3$ may be trim-adjusted.

Figure 6:
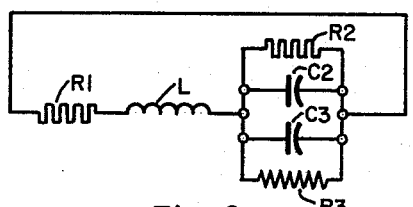
FIG. 6 is a schematic view similar to FIG. 3 but with certain of the elements omitted and others rearranged to expedite the explanation of the invention.

FIG. 6 illustrates, in slightly different form, the schematic circuit of the invention as illustrated in FIG. 3. This arrangement is made possible because of the fact that the load and source impedances are quite low and may be disregarded when current flow through the voltage winding due to the mutual inductance between the windings 2 and 4 is being considered.

If, as has been shown to be necessary, the phase angles of $Z_2$ and $Z_3$ are equal then, the tangents of these phase angles are equal and $$\frac{X_{C2}}{R_2} = \frac{X_{C3}}{R_3}$$

where $$X_C = \frac{1}{JwC} \text{ or } \frac{C_2}{R_3} = \frac{C_3}{R_2} \quad (8)$$

or $$R_3 C_3 = R_2 C_2 \quad (9)$$

The above may also be written as:

$$\frac{C_2}{R_3} = \frac{C_3}{R_2} = \frac{C_2 + C_3}{R_2 + R_3} \quad (10)$$

Referring again to FIG. 6 the impedance represented by the parallel elements may be expressed as follows:

$$Z_p = \frac{1}{\frac{JwC_2}{1} + \frac{JwC_3}{1} + \frac{R_3 + R_2}{R_2 R_3}}$$

$$= \frac{-Jw(C_2+C_3)(R_2R_3)^2 + (R_2R_3)(R_2+R_3)}{w^2(R_2R_3)^2(C_2+C_3)^2 + (R_3+R_2)^2} \quad (11)$$

Since to have zero power factor due to the induced current, the J terms in the parallel networks must equal $jwL$ and therefore $$L = \frac{(C_2+C_3)(R_2R_3)^2}{(R_3+R_2)^2 + w^2(R_2R_3)^2(C_2+C_3)^2}$$

Since the values of $C_2$ and $C_3$ are small $(C_2+C_3)^2$ will be small and the equation may be written $$L = (C_2+C_3)\frac{(R_2R_3)^2}{(R_2+R_3)^2} \quad (12)$$

with good accuracy.

Referring again to FIG. 4, the equation for the impedance $Z_4$ thereof may be written $$Z_4 = R_1 + JwL + \frac{1}{\frac{1}{R_4} + \frac{JwC_2}{1}} \quad (13)$$

This may be further expanded and since the J term will be zero with the circuit value of $R_4$ $$0 = JwL + Jw^3 L C_2{}^2 R_4{}^2 - JwC_2 R_4{}^2$$

or $$L = \frac{C_2 R_4{}^2}{(1 + w^2 C_2{}^2 R_4{}^2)}$$

Since $C_2$ is extremely small $w^2 C_2{}^2 R_4{}^2$ may be disregarded with the result that $L = C_2 R_4{}^2$ (14)

If in Equation 12 we substitute the quantity $$\frac{C_2}{R_3}$$

for its equivalent $$\frac{C_2 + C_3}{R_2 + R_3}$$

(see Equation 10) then $$L = \frac{C_2}{R_3} \cdot \frac{(R_2 R_3)^2}{R_2 + R_3} = \frac{C_2 R_2{}^2 R_3}{R_2 + R_3}$$

and $0 = C_2 R_2{}^2 R_3 - LR_2 - LR_3$ which is a quadratic with $R_2$ being the only unknown since $C_2$ and $R_3$ and $L$ have all been determined.

$$R_2 = \frac{+L \pm \sqrt{L^2 + 4 C_2 R_3{}^2 L}}{2 C_2 R_3} \quad (16)$$

Substituting $L = C_2 R_4{}^2$ (14) in Equation 16

$$R_2 = \frac{C_2 R_4{}^2 \pm \sqrt{C_2{}^2 R_4{}^4 + 4 C_2{}^2 R_3{}^2 R_4{}^2}}{2 C_2 R_3} \quad (17)$$

Since $$\frac{C_2}{R_3} = \frac{C_3}{R_2} \quad (8) \quad R_2 = \frac{C_3 R_3}{C_2}$$

Since $C_2$ and $R_3$ are constants $C_3$ is a constant and $R_2 = KR_3$ where K is a constant expressed by the ratio $$K = \frac{R_2}{R_3} \quad (18)$$

If Equation 17 is divided by $R_3$ it becomes K $$K = \frac{C_2 R_4{}^2 \pm \sqrt{C_2{}^2 R_4{}^4 + 4 C_2{}^2 R_3{}^2 R_4{}^2}}{2 C_2 R_3{}^2} = \frac{R_4{}^2}{2 R_3{}^2} + \sqrt{\frac{R_4{}^2}{R_3{}^2} + \frac{R_4{}^4}{4 R_3{}^4}} \quad (19)$$

Inspection shows that Equation 19 is identical to Equation 5 and therefore the constant set forth in Equation 5 defines the relationships between the measured resistors and resistor $R_2$ and between the innate capacitance $C_2$ of the coil 4 and the compensating capacitor $C_3$.

What is claimed and is desired to be secured by United States Letters Patent is as follows:

1. In an electrical instrument for use in measuring electrical quantities in alternating potential networks, means providing an alternating electromagnetic field, an electrical coil having multiple turns of a conductor and having end terminals, means pivotally supporting said coil in said field for movement as a consequence of current flow through said coil, said coil having resistance and inductance and capacitance, a first resistor connected in shunt with said coil, a second resistor having end terminals, means connecting together one of said end terminals of said coil and said second resistor whereby said second resistor is connected in series with said coil, means including a source of alternating potential completing a circuit between the other of said end terminals of said coil and said second resistor for causing a first current to flow, and a capacitor connected in shunt with said second resistor, the values of said capacitor and said first resistor being such that current circulating in said coil due to said alternating field is phase displaced 90 degrees from said first current.

2. A wattmeter comprising a pair of mutually inductive coils, means mounting said coils for relative movement, one of said coils having inductance and resistance and capacitance, a first resistor connected in shunt relation with said one coil, a second resistor connected in series with said one coil, and a capacitor connected in shunt with said second resistor, the magnitude of said capacitor and said resistors being so related that current flowing through said one coil as a consequence of the current flow through the other of said coils is substantially ninety degrees out of phase with the current flowing through said other coil.

3. In an electrodynamic instrument, means operable when energized to establish a magnetic field the magnitude of which is variable at a predetermined frequency, a coil located in said field and adapted to be pulsatingly energized by connection to a source of pulsating potential, means supporting said coil for movement relative to said field as a function of the relative magnitudes of said field and of the current flow through said coil, a first resistor connected in shunt with said coil, a second resistor connected in series with said coil and effective to calibrate the current flow through said coil as a function of the magnitude of said potential, and a capacitor, said capacitor being shunt connected to said second resistor, the magnitudes of resistance of said first resistor and said second resistor being of the same ratio as the magnitudes of capacity of said capacitor and of said coil.

4. The method of frequency compensating a wattmeter having a current winding and a voltage winding and in which the relative position of said windings is indicated by an indicator comprising the steps of causing alternating current to flow through the current winding at a frequency not substantially less than the maximum rated design frequency of the wattmeter and of a magnitude substantially equal to the rated current of the wattmeter, of inserting resistance in shunt with the voltage winding until there is substantially zero deflection of said indicator, of thereafter disconnecting the first introduced shunt connected resistance, of thereafter flowing current through said current winding from a voltage source having a frequency which is not greater than the minimum rated frequency of the wattmeter and of a magnitude equal to the rater current of the wattmeter, of connecting the voltage coil through resistance to the voltage source, of changing the magnitude of the second introduced resistance until said indicator shows a full scale indication, of thereafter adding a shunt resistor in shunt with the voltage coil of a magnitude equal to $$R_3 \left[ \frac{R_4^2}{2R_3^2} + \sqrt{\frac{R_4^2}{2R_3^2} + \frac{R_4^4}{4R_3^4}} \right]$$

and a capacitor in shunt with the second introduced resistance of a magnitude equal to $$C_2 \left[ \frac{R_4^2}{2R_3^2} + \sqrt{\frac{R_4^2}{R_3^2} + \frac{R_4^4}{4R_3^4}} \right]$$

where $R_3$ equals the magnitude of the second introduced resistance, $R_4$ equals the magnitude of the first introduced resistance, and $C_2$ equals the distributed capacity of the voltage winding.

5. The method of frequency compensating a wattmeter having a current winding and a voltage winding and in which the relative position of said windings is indicated by an indicator comprising the steps of causing alternating current to flow through the current winding at a frequency not substantially less than the maximum rated design frequency of the wattmeter and of a magnitude substantially equal to the rated current of the wattmeter, of inserting resistance in shunt with the voltage winding until there is substantially zero deflection of said indicator, of thereafter disconnecting the first introduced shunt connected resistance, of thereafter flowing current through said current winding from a voltage source having a frequency which is not greater than the minimum rated frequency of the wattmeter and of a magnitude equal to the rated current of the wattmeter, of connecting the voltage coil through resistance to the voltage source, of changing the magnitude of the second introduced resistance until said indicator shows a full scale indication, of thereafter adding a shunt resistor in shunt with the voltage coil of a magnitude equal to $$R_3 \left[ \frac{R_4^2}{2R_3^2} + \sqrt{\frac{R_4^2}{2R_3^2} + \frac{R_4^4}{4R_3^4}} \right]$$

and a capacitor in shunt with the second introduced resistance of a magnitude equal to $$C_2 \left[ \frac{R_4^2}{2R_3^2} + \sqrt{\frac{R_4^2}{R_3^2} + \frac{R_4^4}{4R_3^4}} \right]$$

where $R_3$ equals the magnitude of the second introduced resistance, $R_4$ equals the magnitude of the first introduced resistance, and $C_2$ equals the distributed capacity of the voltage winding, of applying the rated wattage of the wattmeter to a load at maximum and minimum rated frequencies, of connecting said voltage and current coils to measure the load voltage and load current respectively, and of trim adjusting said second introduced resistor and said capacitor to get a full scale indication at each of the applied frequencies.

6. The method of frequency compensating an electrodynamic instrument having relatively movable separately energizable coils comprising the steps of causing alternating current to flow through one of said windings and of measuring the magnitude of resistance shunt connected to the other of said coils which is required to prevent any relative movement of the coils, of applying a predetermined voltage to said other winding and concurrently flowing current of predetermined magnitude through said one winding, and of measuring the magnitude of resistance in series with said winding which is necessary to cause said coils to assume a predetermined relative position.

7. The method of frequency compensating an electrodynamic instrument having relatively movable separately energizable coils comprising the steps of causing alternating current at a relatively high audio frequency to flow through one of said windings and of measuring the magnitude of resistance shunt connected to the other of said coils which is required to prevent any relative movement of the coils, of applying predetermined voltage at a relatively low power frequency to said other winding and concurrently flowing current at a relatively low power frequency of predetermined magnitude through said one winding, and of measuring the resistance in series with said other winding which is necessary to cause said coils to assume a predetermined relative position.

8. In an electric instrument, a pair of mutually inductive coils, means mounting said coils for relative movement, one of said coils having inductance, resistance, and capacitance, a first resistor connected in shunt with said one coil, a second resistor connected in series with said one coil, a capacitor connected in shunt with said second resistor, the magnitude of the capacitance of said capacitor in farads being equal to the magnitude of the capacitance of said one coil in farads multiplied by a constant, the magnitude of the resistance of said first resistor in ohms being equal to the magnitude of the resistance of said second resistor in ohms multiplied by said constant, said constant being equal to $$\frac{(R_4)^2}{2(R_3)^2} + \sqrt{\frac{(R_4)^2}{(R_3)^2} + \frac{(R_4)^4}{4(R_3)^4}}$$

where $R_3$ equals the magnitude of the resistance of said second resistor in ohms, and $R_4$ equals the magnitude of the resistance in ohms which when connected in shunt with said one coil will cause no relative movement of said coils when a desired maximum current is caused to flow through the other of said pair of coils.

References Cited in the file of this patent

UNITED STATES PATENTS

| | | |
|---|---|---|
| 2,031,207 | Browning | Feb. 18, 1936 |
| 2,205,228 | Smith | June 18, 1940 |
| 2,897,446 | Rich | July 28, 1959 |

FOREIGN PATENTS

| | | |
|---|---|---|
| 13,138 | Switzerland | Nov. 7, 1896 |

OTHER REFERENCES

Publication, Inductronic Electrodynamometer, by R. F. Estoppey, at pages 393 through 398 in the September 1959, AIEE Transactions.